C. L. JOHNSON.
CLINICAL THERMOMETER.
APPLICATION FILED AUG. 26, 1919.

1,358,372. Patented Nov. 9, 1920.

Inventor:
Charles L. Johnson,
By Frederick V. Winters
Attorney.

UNITED STATES PATENT OFFICE.

CHARLES LAWSON JOHNSON, OF RIPLEY, TENNESSEE.

CLINICAL THERMOMETER.

1,358,372.  Specification of Letters Patent.  Patented Nov. 9, 1920.

Application filed August 26, 1919. Serial No. 319,948.

*To all whom it may concern:*

Be it known that I, CHARLES LAWSON JOHNSON, a citizen of the United States, residing at Ripley, in the county of Lauderdale and State of Tennessee, have invented certain new and useful Improvements in Clinical Thermometers, of which the following is a full, clear, and exact specification.

This invention relates to thermometers, and especially to clinical thermometers.

The object of the invention is to provide a clinical thermometer which will not break easily, as when it is dropped accidentally or hit against the teeth of the patient, a glass, or other object. It is also the aim of this invention to provide a thermometer which is protected against breakage and is of convenient size and weight, and can be easily read without removal from its protecting casing. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1:
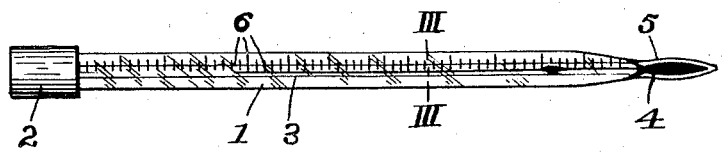
Figure 1 is a plan view of a thermometer inclosed in a protective casing of celluloid or other non-breakable transparent material.
Figure 2:
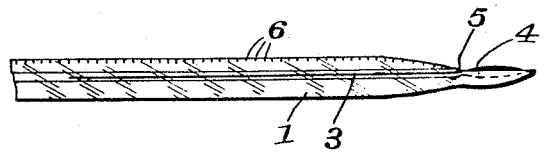
Fig. 2 is a partial side elevation of the same, showing how the bulb of the thermometer is exposed at one side.
Figure 3:
Fig. 3 is a section on the line III—III of Fig. 1.

Referring first to Figs. 1, 2 and 3 of the drawings, 1 designates a tubular casing of celluloid or other suitable transparent material which is not easily broken or fractured. Said casing is made to conform generally to the shape of a thermometer such as is in common use, and may have a cap 2 at one end and an opening 5 at the other end to expose one side of the bulb 4 of the thermometer 3 which is arranged centrally within said casing. The scale 6 of the thermometer is clearly readable through the casing which is permanently mounted to surround said thermometer, as shown. In use, the bulb end is inserted in the mouth of the patient, as usual, the exposed side of the bulb 4 coming in direct contact with the tongue.

Figure 4:
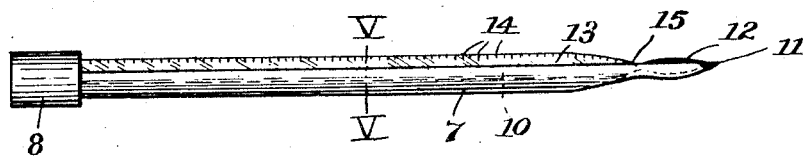
Fig. 4 is a side elevation of a modified form of casing made of opaque material with a transparent cover strip or window through which the thermometer may be read.
Figure 5:
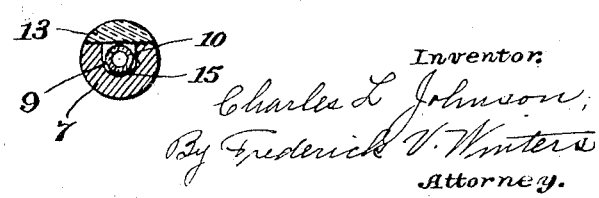
Fig. 5 is a section on the line V—V of Fig. 4, drawn to a larger scale.

In Figs. 4 and 5 is illustrated a modified form of casing 7 of aluminium or other suitable metal or opaque material having a channel 8 extending longitudinally thereof into which the thermometer 10 is snugly fitted. The bulb 12 of said thermometer is exposed at one side in the end portion 11 of the channel of the casing. The other end portion of the casing may be fitted with the usual cap 8. Over the channel there is cemented, welded or otherwise permanently secured a cover strip or window 13 of celluloid, glass, or other suitable transparent material through which the scale 14 may be easily read. As clearly shown in Fig. 4, this strip 13 terminates short of the bulb end of the thermometer, so that said bulb is left exposed for the purpose already explained.

As an aid in reading the scale of the thermometer from the outside of the casing, the opposite face of the thermometer may have a painted line, preferably white, extending along the same, as at 15 in both forms.

Having thus described my invention, what I claim as new and desire to secure by Letters Patent of the United States is:—

1. The combination with a thermometer, of a protecting casing entirely surrounding the body portion of the same and partially inclosing the bulb, there being an opening in said casing through which one side of the bulb of the thermometer projects, said casing also having a transparent portion extending along the body of the thermometer through which the scale thereof may be read.

2. The combination with a thermometer, of a casing of opaque material having a channel in which the thermometer is housed flush with the sides of said channel, and a cover strip of transparent material permanently secured to the sides of said channel over the thermometer.

3. The combination with a thermometer, of a casing of opaque material having a channel in which the body portion and bulb of the thermometer are housed, and a cover strip of transparent material secured to the sides of said channel over the body portion of the thermometer, said strip terminating short of the bulb of the thermometer, leaving the latter exposed on one side in the channel at the end of the casing for the purpose specified.

In testimony whereof I have signed my name to this specification.

CHAS. L. JOHNSON.